(12) United States Patent
Vahle

(10) Patent No.: US 12,620,745 B2
(45) Date of Patent: May 5, 2026

(54) CHARGING CABLE FOR ELECTRIC VEHICLES

(71) Applicant: AUDI AG, Ingolstadt (DE)

(72) Inventor: Sebastian Vahle, Landshut (DE)

(73) Assignee: AUDI AG, Ingolstadt (DE)

( * ) Notice: Subject to any disclaimer, the term of this patent is extended or adjusted under 35 U.S.C. 154(b) by 622 days.

(21) Appl. No.: 18/067,612

(22) Filed: Dec. 16, 2022

(65) Prior Publication Data

US 2023/0198189 A1     Jun. 22, 2023

(30) Foreign Application Priority Data

Dec. 22, 2021     (DE) ......................... 102021134323.2

(51) Int. Cl.
| | |
|---|---|
| *H01R 13/447* | (2006.01) |
| *B60L 53/16* | (2019.01) |
| *H01R 13/52* | (2006.01) |
| *H02J 7/00* | (2006.01) |

(52) U.S. Cl.
CPC ............ *H01R 13/447* (2013.01); *B60L 53/16* (2019.02); *H01R 13/5213* (2013.01); *H02J 7/0042* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 5,609,492 A | 3/1997 | Sato et al. | |
| 11,146,029 B1 * | 10/2021 | Shaffer | ................ H01R 13/502 |
| 11,504,204 B2 * | 11/2022 | Wissmann | ............ A61B 50/00 |
| 2008/0174980 A1 * | 7/2008 | Krispin | .................. F16B 2/185 |
| | | | 361/809 |
| 2021/0135396 A1 | 5/2021 | Knudtzon | |

FOREIGN PATENT DOCUMENTS

| | | | | |
|---|---|---|---|---|
| CN | 102629715 A | * | 8/2012 | ......... H01R 13/5213 |
| CN | 102683987 A | | 9/2012 | |
| CN | 109346878 A | | 2/2019 | |
| DE | 328701 C | | 11/1920 | |
| DE | 7235058 U | | 1/1973 | |
| DE | 20116151 U1 | * | 5/2002 | ............. A47J 19/04 |
| DE | 102015122038 A1 | | 6/2017 | |
| DE | 102017201450 A1 | * | 8/2018 | ............ H01R 13/52 |
| EP | 2966732 A1 | | 1/2016 | |
| GB | 2435554 A | | 8/2007 | |
| WO | 2015144564 A1 | | 10/2015 | |

* cited by examiner

*Primary Examiner* — Tho D Ta
(74) *Attorney, Agent, or Firm* — Seed Intellectual Property Law Group LLP

(57) ABSTRACT

A charging plug and a charging cable for electric vehicles, as well as a method for using the charging cable, are provided.

10 Claims, 3 Drawing Sheets

CHARGING CABLE FOR ELECTRIC VEHICLES

BACKGROUND

Technical Field

Embodiments of the invention include a charging plug and a charging cable for electric vehicles as well as a method for using the charging cable.

Description of the Related Art

Charging cables having a charging plug are known and serve for charging of PHEV and BEV vehicles. In this case, the charging cable is either part of the charging station or the charging station only has a charging receptacle and the vehicle's own charging cable is used as the charging cable. Many charging cables are outfitted with a protective cap, which protects the charging plug against dirt and grime. There are charging cables for which the fastening of the protective cap consists of a plastic rope or plastic cable, which is attached either to the charging plug or the charging cable When the charging cable is plugged into the car, the protective cap hangs down loosely and may scratch the paint finish. Furthermore, contaminants (such as rain water) may collect in the protective cap in this way. When the protective cap is placed on the charging plug after the charging process, water can get into the charging plug in this way and result in malfunctions. In designs where the protective cap is attached flexibly to the charging cable, the protective cap on the charging cable may slide down and lie on the ground. There is a risk of damaging the protective cap. A plastic rope or plastic cable used to attach the protective cap can easily be torn off and one can then lose the protective cap.

From DE 10 2015 122 038 A1 there is known a connector piece having a cover element, comprising a housing, at least one plug section arranged on the housing for plugging into a mating connector piece, at least one contact element arranged on the plug section for making contact with the mating connector piece, and a movable cover element, which at least partly cover the plug section in a covering position and which can be moved out from the covering position in order to release the plug section. In addition, there are provided a guide element, an activating element which can be moved along the guide element in an activating direction, and a lever element which can swivel about a pivot axis, being connected to the cover element and coupled to the activating element such that, by moving the activating element in the activating direction, the cover element can be moved out from the covering position. The cover element is open at the top and is swiveled downward away from the plug section.

EP 2 966 732 A1 relates to a charging plug, which is to be connected to a connector provided in a vehicle in order to provide current for charging a battery installed in the vehicle. The charging plug comprises a housing body having a connection section which can be connected to the connector at the vehicle side; a protective cap consisting of an insulating material which can be mounted on the connection section, a power cable, and an interlock section for locking the connector at the vehicle side and the connection section in a joined condition, it being possible to remove the protective cap from the connection section and fasten it to the power cable when the connection section is joined to the connector at the vehicle side.

DE 10 2017 201 450 A1 discloses a charging device having a plug unit for a detachable connection to a plug receptacle of a vehicle, comprising a housing, and also a cover element for protection of electrical contacts of the plug unit in a covering position, the cover element being fastened permanently by means of a flexible fastening element to the charging device, and being designed such that it can be removed from the covering position to a releasing position, while the charging device has a mechanism which fastens the cover element directly to the plug unit in removable manner.

BRIEF SUMMARY

Some embodiments provide a charging plug and a charging cable for cars, in which water or dirt getting into the charging plug can be effectively prevented.

Some embodiments include a charging plug for electrical charging of an energy accumulator of an electric vehicle. The charging plug comprises a connector with electrical contacts as well as a protective cap, a first wire bracket fastened on the charging plug, and a bracket closure, comprising a second wire bracket fastened on the protective cap, engaging with the first wire bracket and forming together with it a toggle lever mechanism, by which the protective cap is movable between a first position, in which the protective cap covers the connector and is pressed against the charging plug, and a second position, in which the protective cap is located on the top side of the charging plug, the opening of the protective cap pointing downward.

The connector of the charging plug can be covered by the protective cap in order to prevent dirt or water from getting into the connector, which might result in malfunctioning or damaging of the electrical contacts.

In one embodiment, the protective cap has the shape of a cylinder with circular cross section (e.g., for Type 1 plug or CHAdeMO plug). In another embodiment, the protective cap has the shape of a cylinder whose cross section has the shape of a circular segment with a center angle of >180°, especially >240° (e.g., for Type 2 plug or Tesla Supercharger). The circumferential edge of the protective cap has no openings. In one embodiment, the protective cap has fastening means for the second wire bracket. In one embodiment, the second wire bracket is fastened by means of a fastening means on the outside of the circumferential edge of the protective cap. In another embodiment, the top side of the protective cap has a fastening element through which the second wire bracket is led. In one embodiment, the protective cap is additionally outfitted with a seal, e.g., a rubber seal, in order to prevent water from entering the charging plug even more effectively.

In one embodiment, the top side of the charging plug has a seat for the protective cap. The protective cap can be secured in the seat when it is in the second position. This additionally prevent water from getting into the protective cap. In one embodiment, the seat comprises a recess on the top side of the charging plug, the cross section of which corresponds to the cross section of the protective cap. The recess is configured to receive and secure the protective cap. In another embodiment, the seat has a groove to receive the circumferential edge of the protective cap on the top side of the charging plug. The protective cap can be inserted into the groove and thus be secured. In yet another embodiment, the seat has an elevation on the top side of the charging plug, the cross section of which corresponds to the cross section of the protective cap. The protective cap can be mounted on the elevation and thus be secured. In a still further embodiment, the seat has a ridge for fixation of the circumferential edge of the protective cap on the top side of the charging plug. In one embodiment, the length of the ridge is less than the length of the circumferential edge of the protective cap, so that the protective cap can be mounted and fixed on the ridge. In another embodiment, the length of the ridge is greater than the length of the circumferential edge of the protective cap, so that the protective cap can be fixed within the surface enclosed by the ridge.

The bracket closure comprises a first wire bracket, fastened on the charging plug, and a second wire bracket, fastened on the protective cap, engaging with the first wire bracket and forming together with it a toggle lever mechanism. With the bracket closure, the protective cap can be moved between a first position, in which the protective cap covers the connector and is pressed against the charging plug, and a second position, in which the protective cap is located on the top side of the charging plug, the opening of the protective cap pointing downward.

In the first position, the protective cap covers the connector and is additionally pressed against the charging plug by the bracket closure. It is thus actively secured and prevents water from getting in to the connector.

When the bracket closure is opened, the protective cap is swiveled at first forward and then upward by the toggle lever mechanism. Therefore, no opening is needed in the circumferential edge of the protective cap. The protective cap is thus moved into a second position on the top side of the charging plug, in which the protective cap is situated above the charging plug, while the opening of the protective cap points downwards.

Some embodiments include a charging cable for electrical charging of an energy accumulator of an electric vehicle. The charging cable comprises a power cable and at least one charging plug as described herein, which is attached at one end of the power cable. In one embodiment, one end of the charging cable is firmly connected to the power supply of an electric vehicle.

Some embodiments include a method for using the charging cable described herein. In the method, the protective cap of the charging plug is secured by the bracket closure in a first position for the storage and the transport of the charging cable, in which position the connector is covered and pressed against the charging plug. The protective cap of the charging plug is moved by means of the bracket closure into a second position in order to perform a charging process, in which position the protective cap is located on the top side of the charging plug, the opening of the protective cap pointing downward. The connector of the charging plug is then inserted into a suitable charging socket of a charging device. After the end of the charging process the connector is removed from the charging socket and the protective cap of the charging plug is once more moved by means of the bracket closure into the first position and secured.

Among the benefits of the solution described herein is that the attachment of the protective cap in a bracket closure effectively seals off the electrical contacts of the charging plug against water and dirt, since the protective cap is pressed onto the charging plug. Thanks to the robust design with two wire brackets, the protective cap cannot be as easily torn off as in the case of an attachment by a plastic rope. During the charging process, the protective cap does not hang down and thus it cannot scratch the paint finish of the car. Since the opening of the protective cap points downwards during the charging process, the entry of dirt or rain water into the protective cap is prevented. Further benefits and embodiments will emerge from the description and the accompanying drawings.

Of course, the features mentioned above and those yet to be explained below can be used not only in the particular indicated combination, but also in other combinations or standing alone, without leaving the scope of the present disclosure.

DETAILED DESCRIPTION

Figure 1:
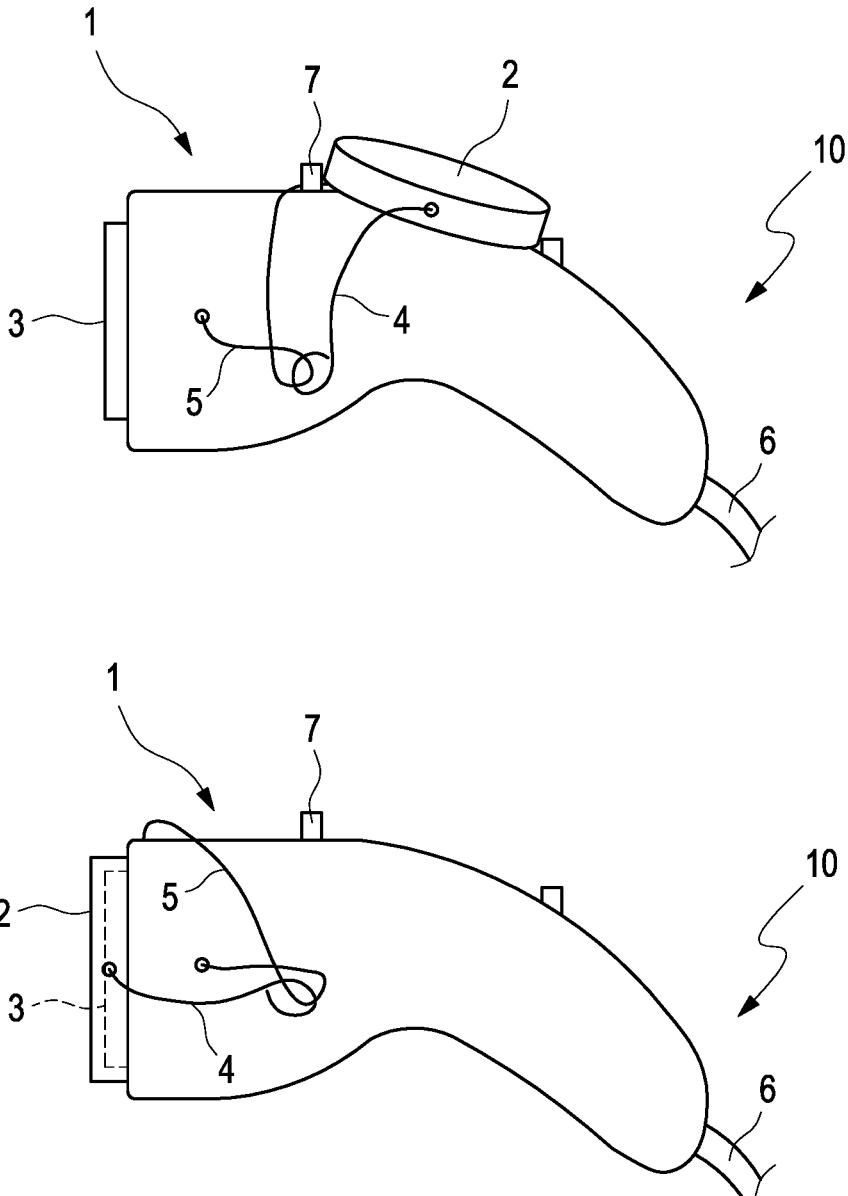
FIG. 1 is a schematic representation of one embodiment of a charging plug and a charging cable.

FIG. 1 shows schematically one embodiment of a charging plug 1 and a section of one embodiment of a charging cable 10.

The upper FIGURE shows the charging plug 1 in the ready to use condition, in which the protective cap 2 is removed from the connector 3 with the electrical contacts. The connector 3 can thus be plugged into a charging socket of a charging device, such as a charging station. The protective cap 2 is held by a fastening mechanism formed from a first fastening bracket 4 and a second fastening bracket 5 such that its opening points downwards. In this way, no rain water can get into the protective cap 2. In the embodiment shown, the protective cap 2 is furthermore received in a seat 7 located on the top side of the charging plug 1, which additionally protects it against water or grime getting in. The charging plug 1 is attached to a power cable 6, forming the connection to a charging port of the charging cable 10 on the vehicle side. A further charging plug 1 as described herein can be attached to the power cable at the vehicle side, being plugged into a charging socket at the vehicle side, or the power cable 6 is connected directly to the power supply of the vehicle.

The lower FIGURE shows the charging plug 1 in the condition in which the charging cable 10 is kept when not needed for a charging process. The protective cap 2 covers the connector 3 with the electrical contacts and is pressed against the charging plug 1 by the fastening mechanism formed from a first fastening bracket 4 and a second fastening bracket 5. In this way, water or grime cannot get into the protective cap 2 or the connector 3 with the electrical contacts and cause malfunctions.

Figure 2:
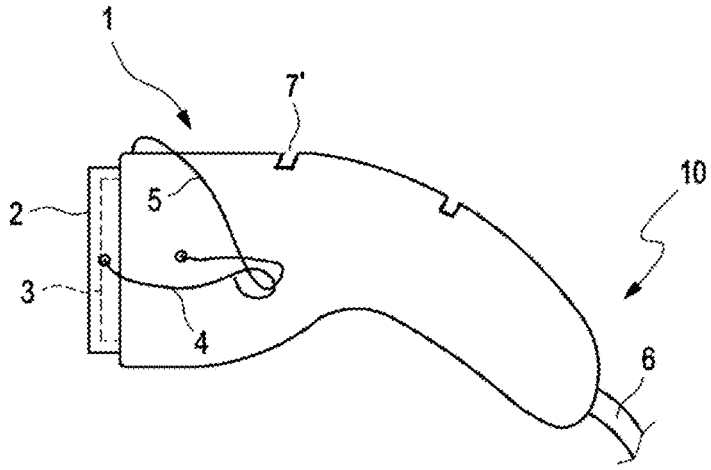
FIG. 2 is a schematic representation of another embodiment of a charging plug and a charging cable having a different seat configuration.
Figure 3:
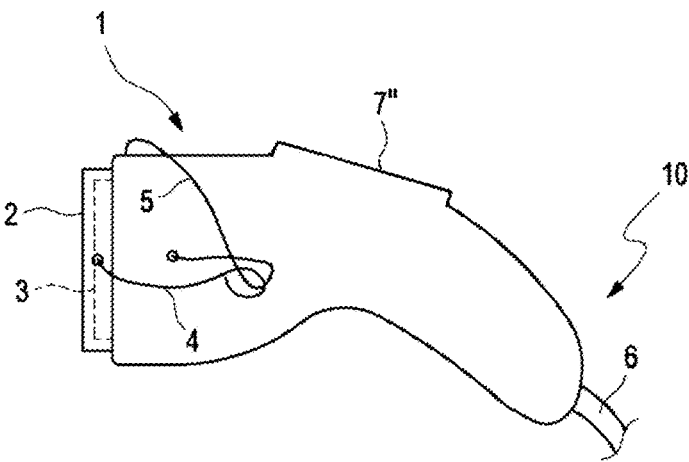
FIG. 3 is a schematic representation of another embodiment of a charging plug and a charging cable having a different seat configuration.
Figure 4:
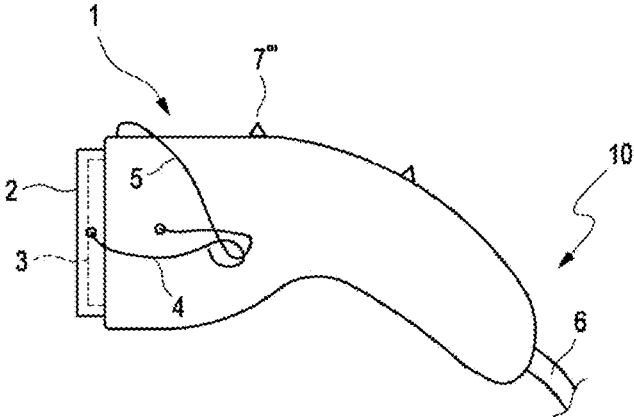
FIG. 4 is a schematic representation of another embodiment of a charging plug and a charging cable having a different seat configuration.

FIGS. 2 through 4 each show a schematic representation of another embodiment of a charging plug and a charging cable having a different seat configuration. More particularly, FIG. 2 shows a seat 7' in the form of grooves to receive a circumferential edge of the protective cap 2 on the top side of the charging plug 1. FIG. 3 shows a seat 7" in the form an elevation on the top side of the charging plug 1, a cross section of which corresponds to a cross section of the protective cap 2. FIG. 4 shows a seat 7″ in the form a ridge for fixation of a circumferential edge of the protective cap 2 on the top side of the charging plug 1.

Figure 5:
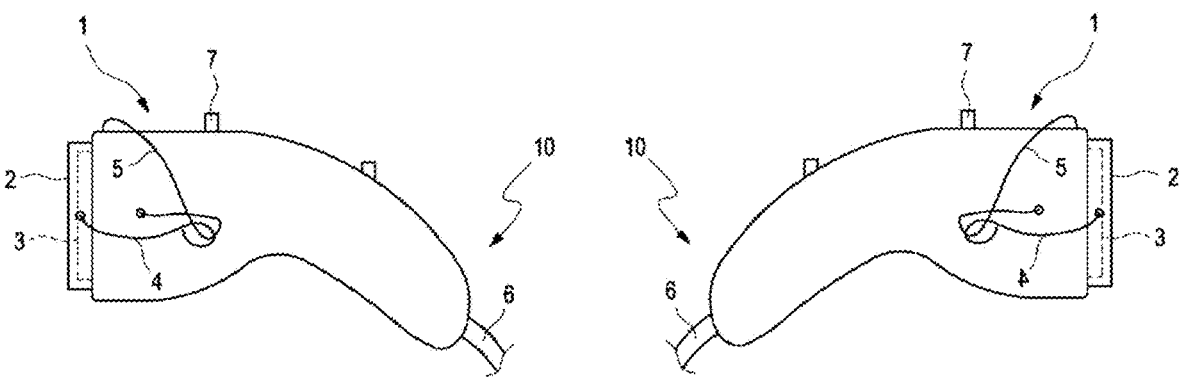
FIG. 5 is a schematic representation of another embodiment of a charging plug and a charging cable having a charging plug at both ends of the charging cable.

FIG. 5 shows a schematic representation of another embodiment of a charging plug and a charging cable having a charging plug 1 at both ends of the charging cable 6.

German patent application no. 10 2021 134323.2, filed Dec. 22, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A charging plug for electrical charging of an energy accumulator of an electric vehicle, the charging plug comprising:
   a connector with electrical contacts;
   a protective cap; and
   a bracket closure, the bracket closure including a first wire bracket fastened to the charging plug and a second wire bracket fastened to the protective cap, wherein the first wire bracket is a separate and distinct structure from the second wire bracket, wherein the second wire bracket is coupled to the first wire bracket and forms together with the first wire bracket a toggle lever mechanism, by which the protective cap is movable and guided by the toggle lever mechanism between a first position, in which the protective cap covers the connector and is pressed against a front end of the charging plug by the toggle lever mechanism, and a second position, in which the protective cap is located on a top side of the charging plug with an opening of the protective cap for accommodating the connector pointing downward.

2. The charging plug according to claim 1, wherein the top side of the charging plug has a seat for the protective cap.

3. The charging plug according to claim 2, wherein the seat comprises a recess on the top side of the charging plug, a cross section of which corresponds to a cross section of the protective cap.

4. The charging plug according to claim 2, wherein the seat has a groove to receive a circumferential edge of the protective cap on the top side of the charging plug.

5. The charging plug according to claim 2, wherein the seat has an elevation on the top side of the charging plug, the cross section of which corresponds to a cross section of the protective cap.

6. The charging plug according to claim 2, wherein the seat has a ridge for fixation of a circumferential edge of the protective cap on the top side of the charging plug.

7. The charging plug according to claim 1, wherein the protective cap is outfitted with a rubber seal.

8. A charging cable for electrical charging of an energy accumulator of an electric vehicle, comprising a power cable and at least one charging plug according to claim 1, which is attached at one end of the power cable.

9. A charging cable for electrical charging of an energy accumulator of an electric vehicle, comprising a power cable and at least one charging plug according to claim 1 attached at both ends of the power cable.

10. A method for using a charging cable for electrical charging of an energy accumulator of an electric vehicle, the charging cable including a power cable and at least one charging plug attached at one end of the power cable, the charging plug including a connector with electrical contacts, a protective cap, and a bracket closure, the bracket closure including a first wire bracket fastened to the charging plug and a second wire bracket fastened to the protective cap, wherein the first wire bracket is a separate and distinct structure from the second wire bracket, wherein the second wire bracket is coupled to the first wire bracket and forms together with the first wire bracket a toggle lever mechanism, by which the protective cap is movable and guided by the toggle lever mechanism, wherein the method comprises:

securing the protective cap of the charging plug, using the bracket closure, in a first position for storage and transport of the charging cable, in which first position the connector is covered by the protective cap and the protective cap is pressed against a front end of the charging plug by the toggle lever mechanism;

moving the protective cap of the charging plug, using the bracket closure, from the first position into a second position to perform a charging process, in which second position the protective cap is located on the top side of the charging plug with an opening of the protective cap for accommodating the connector pointing downward;

inserting the connector of the charging plug into a suitable charging socket of a charging device;

after the end of the charging process, removing the connector from the charging socket; and moving and securing the protective cap of the charging plug, using the bracket closure, from the second position into the first position.

\* \* \* \* \*